United States Patent [19]
Smith et al.

[11] Patent Number: 5,462,410
[45] Date of Patent: Oct. 31, 1995

[54] DAMPER AND SEAL FOR PROPELLER QUILL SHAFT

[75] Inventors: Dale E. Smith, Windsor; Edward W. Chase, III, West Suffield, both of Conn.

[73] Assignee: United Technologies Corporation, Hartford, Conn.

[21] Appl. No.: 338,053

[22] Filed: Nov. 10, 1994

[51] Int. Cl.⁶ .................................................. B64C 11/30
[52] U.S. Cl. .................. 416/165; 416/170 R; 416/500; 464/147; 277/DIG. 9
[58] Field of Search ............... 416/157 R, 165, 416/170 R, 500; 277/DIG. 9; 464/133, 147, 158

[56] References Cited

U.S. PATENT DOCUMENTS

| | | | |
|---|---|---|---|
| 3,171,334 | 3/1965 | Rasmussen | 277/188 A |
| 3,447,822 | 6/1969 | King | 464/158 |
| 3,677,663 | 7/1972 | Cronstedt | 416/500 |
| 3,722,641 | 3/1973 | Kusiak | 416/165 |
| 4,313,463 | 2/1982 | Weirich | 277/188 A |
| 4,523,891 | 6/1985 | Schwartz et al. | 416/165 |

*Primary Examiner*—Edward K. Look
*Assistant Examiner*—James A. Larson
*Attorney, Agent, or Firm*—Norman Friedland

[57] ABSTRACT

Damping and sealing of the quill shaft (30) that transmits torque from one rotating component to another as for example in a pitch change actuator system for aeronautical propellers is provided by an O-ring (40) mounted in the space between the end of ball screw (20) and the flange (41) radially extending from quill shaft (30) and the preload of the O-ring (40) provided by the shims (46) bearing against flange (41) and O-ring (40) which serves to enhance the wearability of splines (26, 28 and 50).

10 Claims, 3 Drawing Sheets

5,462,410

1

DAMPER AND SEAL FOR PROPELLER QUILL SHAFT

TECHNICAL FIELD

This invention relates to aeronautical variable pitch propellers and particularly to means for damping and sealing the quill shaft of the pitch change mechanism.

BACKGROUND ART

As is well known, certain types of pitch change motors for small size variable pitch propellers utilize a ball screw and ball screw nut for controlling the position of a servo motor which in turn drives a piston operatively connected to the blades of the propeller for varying pitch. In certain designs, as for example, for the 14RF and 14SF model propellers manufacturedby the Hamilton Standard division of United Technologies Corporation, the assignee common to this patent application, the torque from the ball screw is transmitted to the torque oil transfer tube by a quill shaft that is splined to both sub-assemblies. This type of propeller is disclosed in U.S. Pat. No. 4,523,891 granted to R. A. Schwartz et al on Jun. 18, 1985 entitled "Propeller Pitch Change Actuation System" which was also assigned to the above-noted assignee and which is incorporated herein by reference.

While the propeller disclosed in the U.S. Pat. No. 4,523,891 supra, has been satisfactory, there have been instances where unacceptable rates of wear have been experienced on the ball screw spline which mates with the quill shaft. Such wear was occasioned by high vibration loads coupled with cyclic torsion loads, resulting in wear producing impact loading at a high cycle per second rate.

We have found that we can obviate this wear problem by including a damper for dissipating the vibratory loadings encountered, while also providing means for trapping the oil in the spline so as to enhance the lubrication and load carrying capacity of the components.

SUMMARY OF THE INVENTION

An object of this invention is to provide an improved pitch change actuator for an aeronautical propeller by incorporating damping means for the quill shaft and spline assembly.

A feature of this invention is to include an O-ring disposed between the quill shaft and ball screw of the pitch change actuator system and shim means for axially preloading the O-ring. The O-ring squeeze provides both radial pre loading and the seal and that the shimmed O-ring provides axial and radial pre loading. The shimmed O-ring serves as a damper for dissipating vibratory energy encountered in the ball screw/quill shaft spline and the O-ring traps oil in the space between the quill shaft and the ball screw to flood the spline and increase its load carrying capacity.

A feature of this invention is to reduce the wear on the spline of the ball screw/quill shaft assembly by means that are characterized as being relatively easy to manufacture and assemble, low cost and light weight while affording without limitation the following advantages:

1) Limits axial motion of the quill shaft relative to the ball screw;

2) Provides axial and torsional damping;

3) Allows misalignment motion of the quill shaft between the ball screw and the oil tube;

4) Traps the oil in the ball screw/quill shaft spline by

2 sealing the surfaces contacting the O-ring resulting in optimum lubrication increased load capacity and enhanced wear characteristics.

The foregoing and other features of the present invention will become more apparent from the following description and accompanying drawings.

BEST MODE FOR CARRYING OUT THE INVENTION

While this invention is being described for utilization on a variable pitch aeronautical propeller, as one skilled in this art will appreciate, this invention has utility for any type of transmission apparatus that transmits torque with the use of a quill shaft where misalignment would otherwise be a problem. In other words, this invention is particularly efficacious in torque transmission devices that require means for accommodating misalignments.

For convenience and simplicity sake only the details of the invention are being shown and it is to be understood that the invention is being utilized with a conventional pitch change control system and pitch change actuator system and for further details reference should be made to the propeller models alluded to in the above and to the U.S. Pat. No. 4,523,891 supra. Essentially, the pitch change control system serves to vary the pitch of the blade for various modes of operation, including such features as reversing, pitch lock, feathering, Beta and/or speed governor control and the like.

Figure 1:
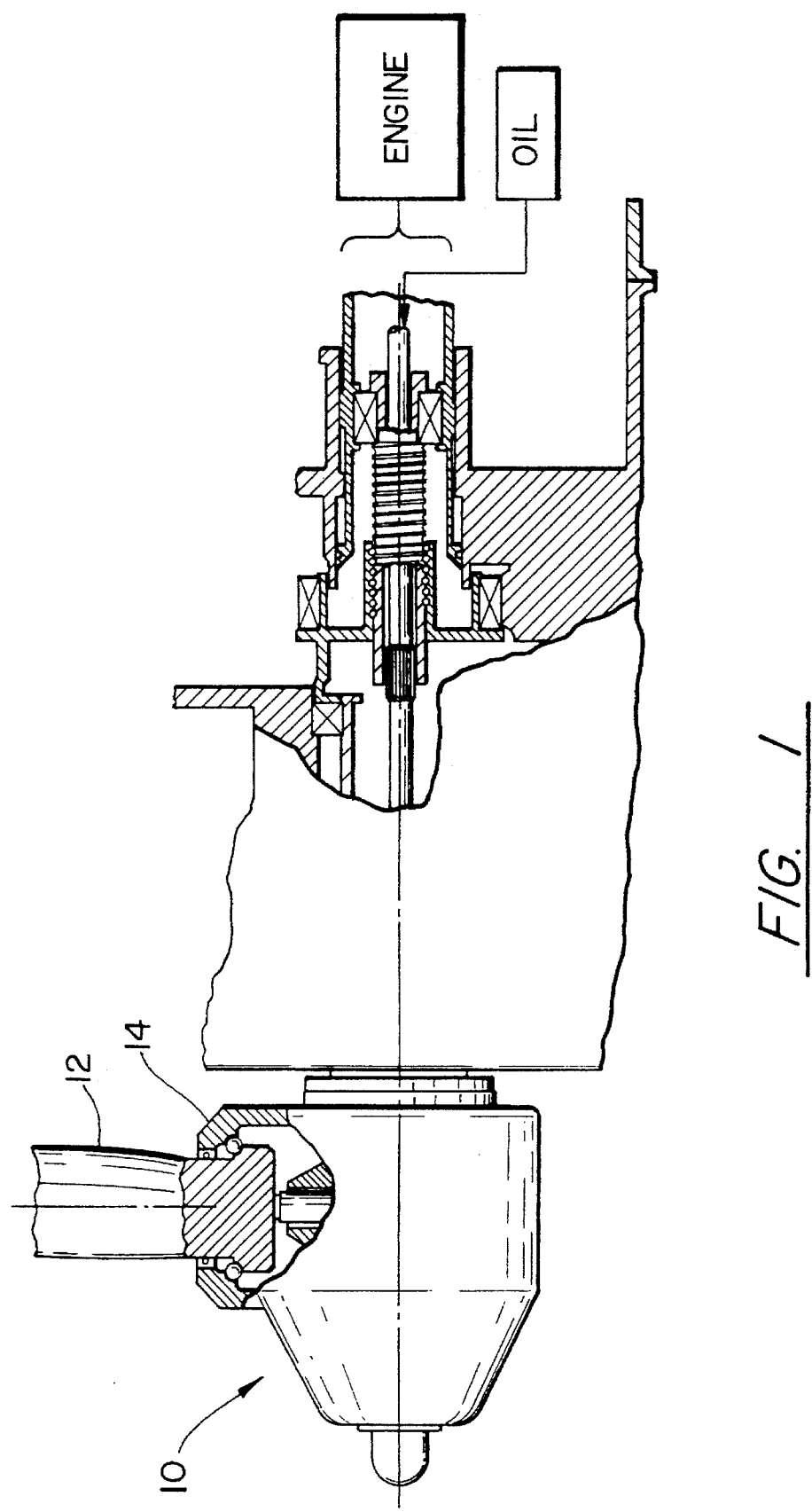
FIG. 1 is a schematic view in elevation disclosing a variable pitch propeller of the type utilizing this invention.
Figure 2:
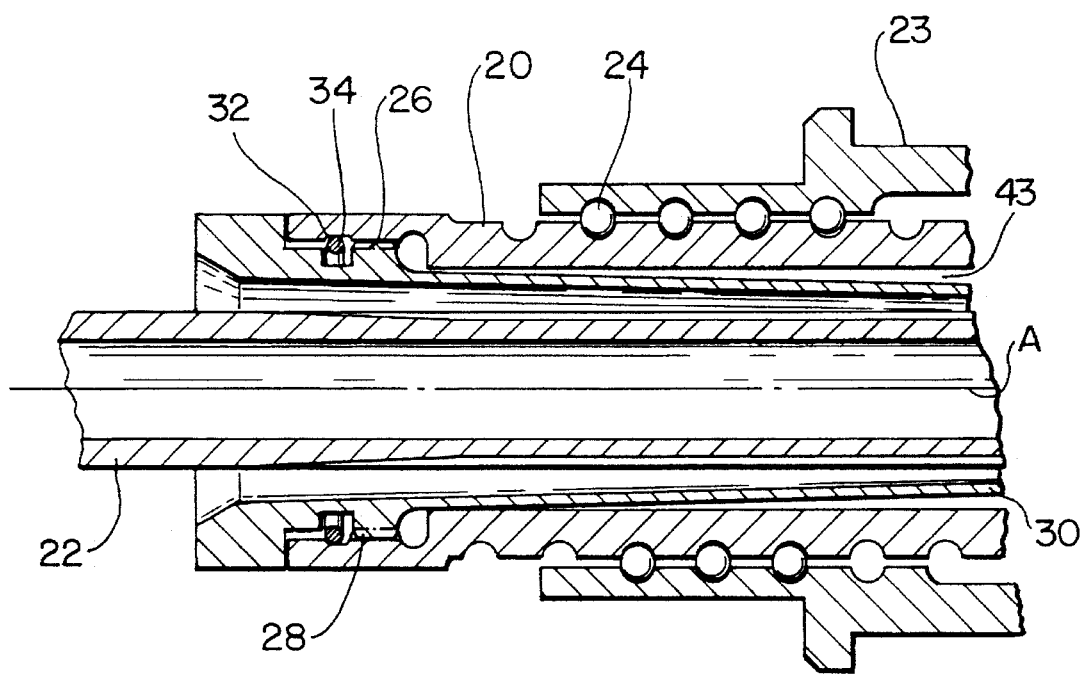
FIG. 2 is a partial view of a prior art quill shaft of the pitch change actuator of a variable pitch propeller.

The invention will be best understood by referring to FIG. 1 showing a variable pitch propeller and FIG. 2 showing the details of the prior art quill shaft of the pitch change actuation system. The variable pitch propeller generally indicated by reference numeral 10 consists of a plurality of circumferentially spaced blades 12 (one being shown) supported for rotary motion and pitch change motion in hub 14. The hub and blades are typically connected to a suitable propulsion plant, piston or gas turbine engine, through a suitable gear box and the pitch of the blade is typically controlled through a pitch change controller and actuator.

As shown in FIG. 2, the torque from the ball screw 20, which forms a portion of the prior art pitch change actuation system, is transferred to the torque tube or oil tube 22 via the quill shaft 30, which is the portion of the propeller that is the concern of this invention. As is well known, the ball screw 20 responds to the pitch change controller and is translated rectilinearly. This motion is converted to rotary motion through the balls 24 and the thread configuration in the ball screw 20 and ball screw nut 23. Internal spline 26 formed on ball screw 20 engages external spline 28 formed on quill shaft 30 for imparting rotary motion to the quill shaft which rotates about the axis A. Lock ring 32, which is a retaining wire, fits into annular groove 34 formed in the inner diameter of ball screw 20 to lock the quill shaft to the ball screw. As will become evident from the description to follow, the quill shaft 30 which is tapered radially inward to a reduced diameter is splined to the oil tube 22 at the end opposite the spline 28 for rotating the oil tube 22 in response to the rotation of the ball screw 20.

The retaining wire of lock ring 32 in this design must have a certain amount of looseness that is occasioned by manufacturing and assembly tolerances, which is also necessary to accommodate the required misalignment capability. As mentioned in the Background Section of this patent application, because of the axial high G vibration, the alternating torsional loading occasioned during the cruise mode of the aircraft, where constant speed and propeller synchronizing take place the splines 26 and 28 occassionally experience high rates of wear.

Figure 4:
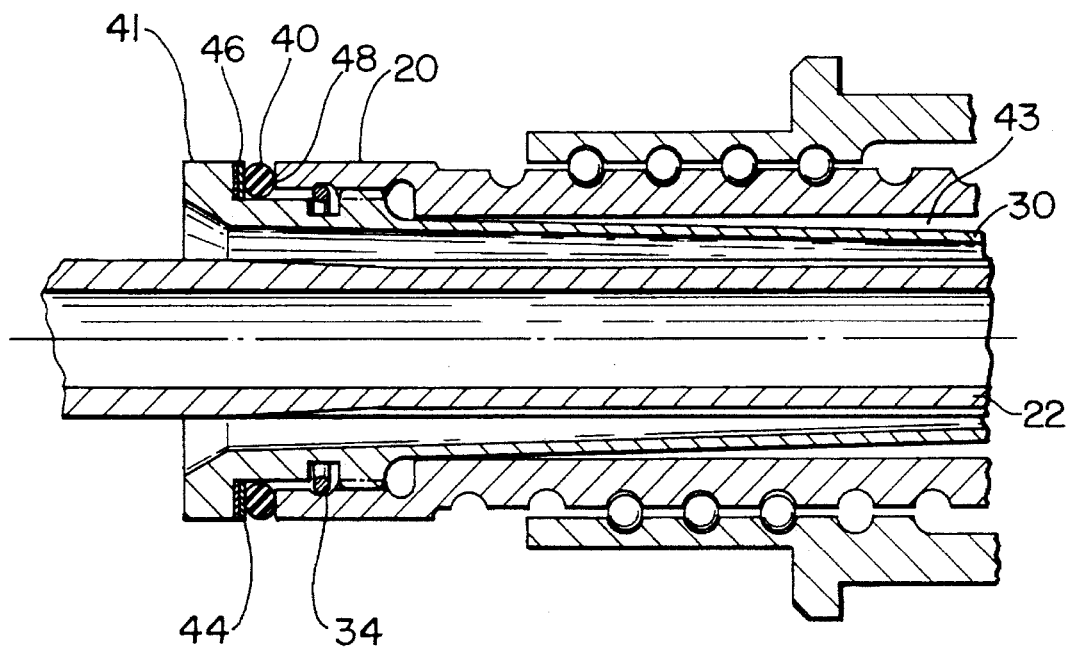
FIG. 4, is an enlarged partial view illustrating the details of the invention.
Figure 3:
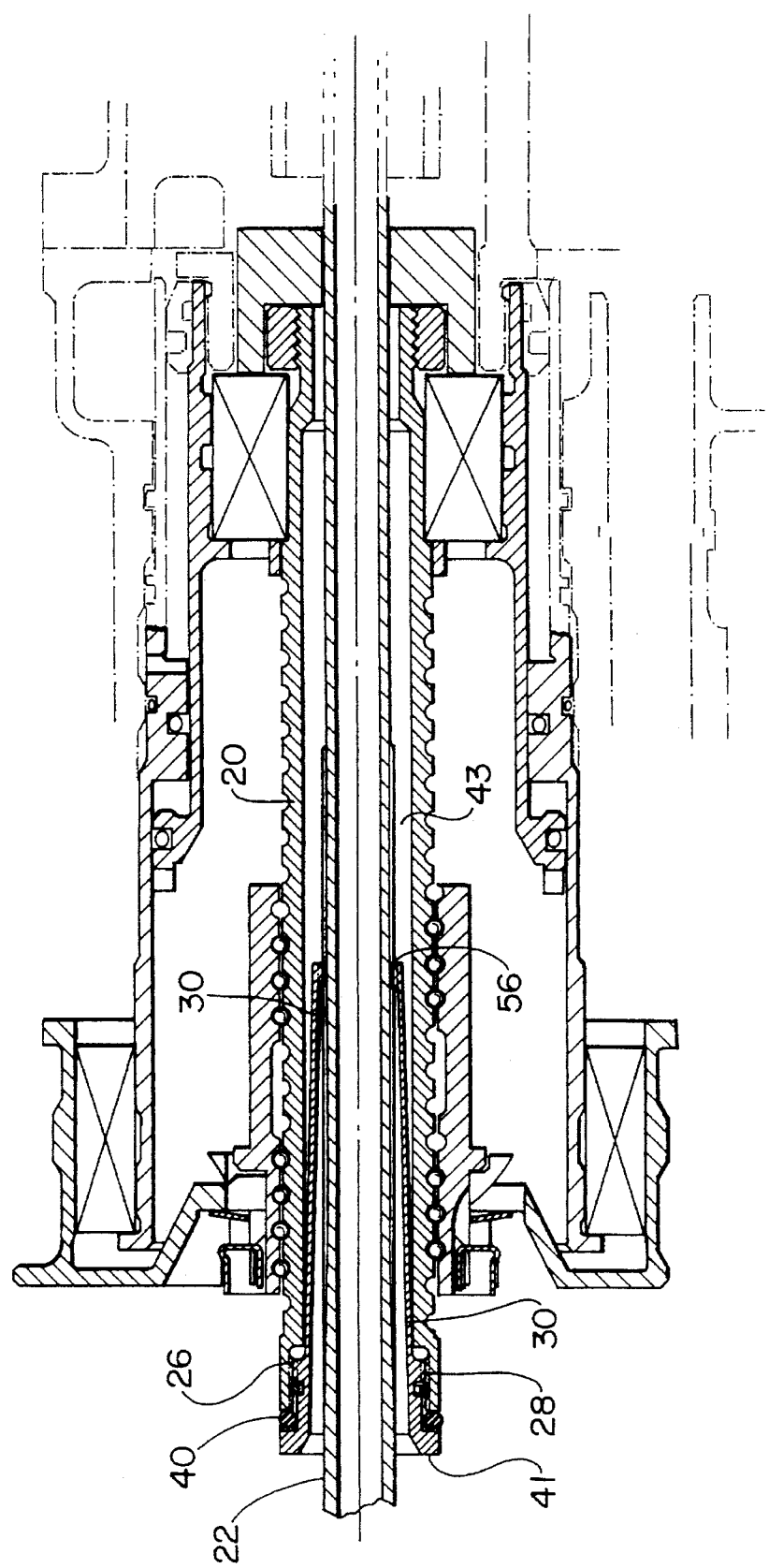
FIG. 3 is a fragmentary sectional view illustrating the quill shaft and showing the details of this invention.

According to this invention and as is disclosed in FIGS. 3 and 4 an O-ring 40 is disposed in the annular space between the end of ball screw and the outwardly and radially extending flange 41 of quill shaft 30. Shim or shims 44 (two being shown), which are formed in washer shaped disks, are inserted between the shoulder 46 of flange 41 and the O-ring 40.

As is apparent from the foregoing, the O-ring 40 bears against the end face 48 of ball screw 20 and is preloaded by the shims 44. This sub-assembly serves as a damper to eliminate or in the very least reduce the axial motion, the axial impact forces, the torsional impact forces and dissipate the energy due to remaining cyclic axial and torsional motion. In addition the oil that normally flows between the oil tube 22 and the ball screw 20 and through the splines in the quill shaft is blocked at the end adjacent the flange 41. The O-ring 40 is fabricated from any suitable elastomeric material such as a synthetic rubber or include any of the well known polymeric materials. The shims 44 may be made from any suitable metallic or elastomeric material such as stainless steel or any of the well known polymeric materials.

By utilizing the shims 44 the axial load on the O-ring is predetermined which essentially serves as a means for force control, it also provides a resilient surface for dissipating energy, particularly in torsion. Hence, the O-ring preload eliminates or limits axial motion and impact loading in both torsional and axial directions and in a conical mode due to misalignment of the oil tube 22 and ball screw 20 center eccentricity.

In comparison test of splines in a damped and undamped configurations, the damped splines demonstrated a wear life increase of more than twenty (20) to One (1).

The purpose of including FIG. 3 is to show the full quill shaft and its splined connections to the ball screw 20 and the oil tube 22. As noted from this FIG. 3, quill shaft 30 is tapered inwardly to a reduced diameter so that the right end of quill shaft 30 is splined to the oil tube 22 via the spline connection 56. Obviously, torque is transmitted from the rotating ball screw 20, to the quill shaft and ultimately to the oil tube 22 via the respective splines. The oil that normally flows in the annular passage 43 formed between the concentrically mounted ball screw 20 and oil tube 22, except for this invention, would flow through the spline and could either void this area or be sufficiently depleted that inadequate lubrication of the moving parts would be evidenced. By virtue of this invention, this area becomes flooded and the possibility of loosing oil is eliminated. This feature is particularly important during backlash movement as will be described in more detail hereinbelow. In the design of the quill shaft, in order to accommodate misalignment, it is necessary to build in a certain amount of backlash which produces a certain amount of motion in the splines. It is abundantly important that oil is present in these splines when this motion occurs. Tests show if the splines are lubricated and are in metal-to-metal contact, the load capacity of the splines are increased by a factor between one hundred (100) and one thousand (1000). Obviously, as mentioned earlier, this area is now sealed and is flooded with lubrication oil so that the problem incidental to the lack of lubrication is obviated.

Additionally, since the splines 26 and 28 of the quill shaft 30 and ball screw 20, respectively, function to transmit torque (reversals) to the Beta valve (not shown) of the pitch change actuation system, coupled with the necessity of a minimal spline backlash, the preloaded O-ring 40 provides damping when relative torsional displacement occur through the backlash as torque reversal occur. Since this is the only torsional damping element in the pitch change actuation system to the beta valve torque path, this invention produces damping in this path in the heretofore known systems that would otherwise not have it.

Although this invention has been shown and described with respect to detailed embodiments thereof, it will be appreciated and understood by those skilled in the art that various changes in form and detail thereof may be made without departing from the spirit and scope of the claimed invention.

We claim:

1. For a torque transmission system for transmitting torque from one rotating component to another rotating component through a quill shaft, said quill shaft having a radially extending flange, said one rotating component being concentrically mounted relative to said another rotating component and lubricating fluid flowing therebetween, said one rotating component having an end axially spaced from said flange and defining therewith an annular groove, an annular seal means disposed in said annular groove and bearing against the end of said one rotating component and said flange for absorbing the vibratory energy encountered by said one rotating component and said another rotating component, and said seal means sealing the lubricating fluid between said one rotating component and said another rotating component.

2. For a torque transmission system for transmitting torque from one rotating component to another rotating component through a quill shaft as claimed in claim 1 including shim means disposed between said flange and said sealing means to preload said sealing means against said one rotating component.

3. For a torque transmission system for transmitting torque from one rotating component to another rotating component through a quill shaft as claimed in claim 2 wherein said sealing means includes an O-ring.

4. For a torque transmission system for transmitting torque from one rotating component to another rotating component through a quill shaft as claimed in claim 3 wherein said one rotating component includes spline means and said quill shaft includes spline means said spline means being in mating relationship with each other.

5. For a torque transmission system for transmitting torque from one rotating component to another rotating component through a quill shaft as claimed in claim 4 wherein said another rotating component includes another spline means and said quill shaft includes additional spline means in engaging relationship with said another spline means.

6. For a pitch change actuation system of an aeronautical propeller including a ball screw, an oil tube and a quill shaft, said ball screw being spaced from and concentrically mounted relative to said oil tube, said quill shaft being coaxially mounted to and disposed between said ball screw and said oil tube and being tapered in an axial direction, said ball screw being rotatably connected to said quill shaft and said quill shaft being rotably connected to said oil tube for transmitting torque from said ball screw to said oil tube, a flange radially extending from said quill shaft being spaced from an end of said ball screw and defining therewith an annular groove, seal means disposed in said annular groove bearing against said flange and said ball screw for absorbing vibratory energy encountered by said ball screw and said oil tube and for trapping oil between said quill shaft and said ball screw.

7. For a pitch change actuation system of an aeronautical propeller as claimed in claim 6 including shim means disposed between said seal means and said flange for preloading said seal means against said ball screw.

8. For a pitch change actuation system of an aeronautical propeller as claimed in claim 7 wherein said seal means is an O-ring.

9. For a pitch change actuation system of an aeronautical propeller as claimed in claim 8 including spline means on said ball screw and additional spline means on said quill shaft said spline means being in mating relationship with each other for transmitting rotary motion.

10. For a pitch change actuation system of an aeronautical propeller as claimed in claim 9 including a second spline means on said quill shaft and a third spline means on said oil tube and said second spline means and said third spline means being in mating relationship with each other for transmitting rotary motion.

* * * * *

UNITED STATES PATENT AND TRADEMARK OFFICE
CERTIFICATE OF CORRECTION

PATENT NO. : 5,462,410
DATED : October 31, 1995
INVENTOR(S) : Dale E. Smith et al It is certified that error appears in the above-identified patent and that said Letters Patent is hereby corrected as shown below:

In the Abstract, last line change "50" to —56—.

Signed and Sealed this

Fifth Day of March, 1996

Attest:

BRUCE LEHMAN

Attesting Officer   Commissioner of Patents and Trademarks